Aug. 21, 1956　　　　　G. C. BOWER　　　　　2,759,580
MAGNETIC CLUTCH TAP DRIVE
Filed Feb. 10, 1951　　　　　　　　　　　　2 Sheets-Sheet 1
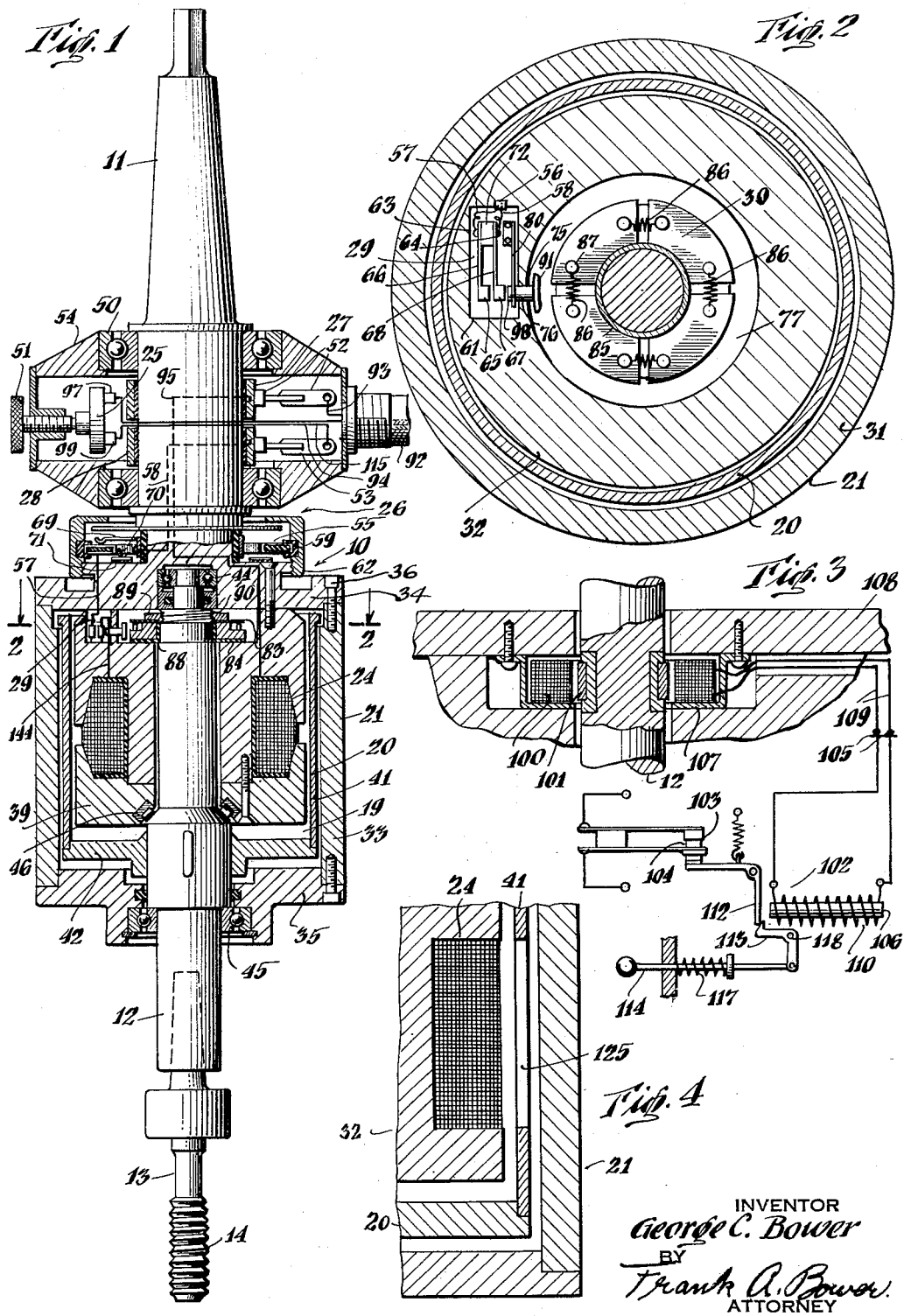
INVENTOR
George C. Bower
BY
Frank A. Bower
ATTORNEY Aug. 21, 1956
G. C. BOWER
2,759,580
MAGNETIC CLUTCH TAP DRIVE
Filed Feb. 10, 1951
2 Sheets-Sheet 2
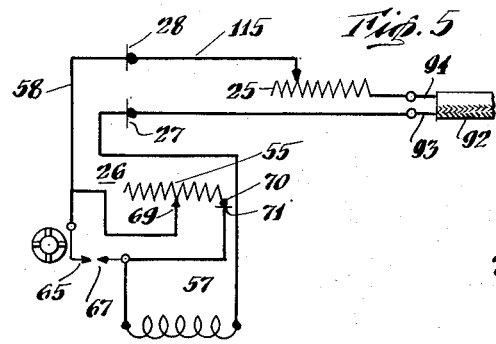
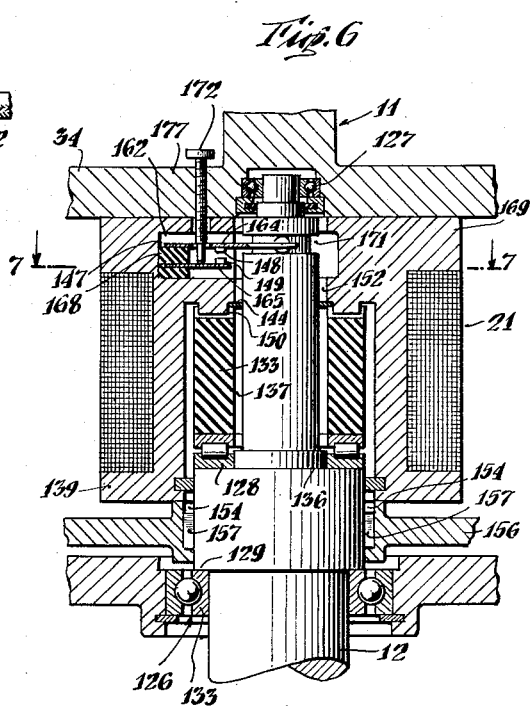
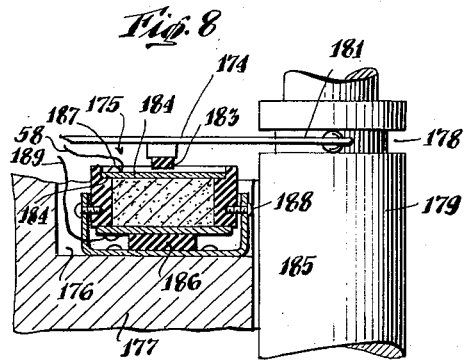
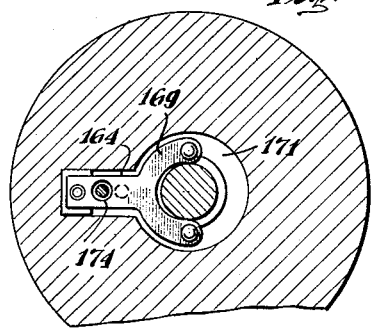
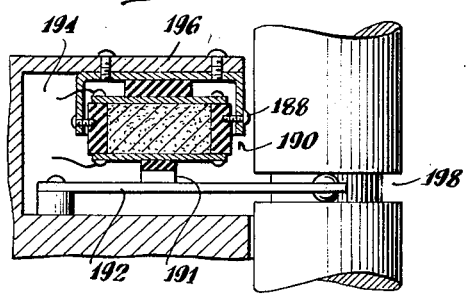
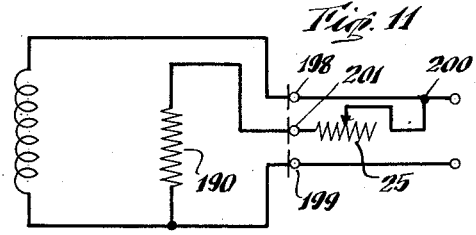
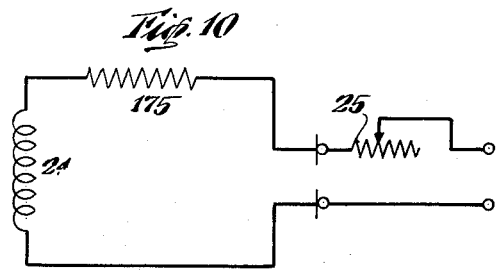
INVENTOR
George C. Bower
BY
Frank A. Bowers
ATTORNEY

United States Patent Office 2,759,580
Patented Aug. 21, 1956

2,759,580

MAGNETIC CLUTCH TAP DRIVE

George C. Bower, Bayside, N. Y.

Application February 10, 1951, Serial No. 210,363

3 Claims. (Cl. 192—21.5)

This invention relates to a torque transmitting device that changes to applying a minimum torque when a maximum torque is impressed.

The object of the invention is to provide a torque transmitting device that does not exceed a designated maximum torque.

Another object of the invention is to provide a torque transmitting device that reverts to a minimum torque transmitting condition on the transmission of a maximum torque.

Another object is to provide a compact torque transmitting device mountable on a tool driving machine to transmit a torque to a cutting tool up to a designated maximum torque and on exceeding the maximum torque automatically changing to apply a minimum torque.

A still further object is to provide a torque transmitting device that is readily adjusted within a range of maximum torques.

Other and further objects will appear from the following description taken in connection with the accompanying drawings in which:

Fig. 1 is a sectional view of the torque transmitting device embodying the invention;

Fig. 2 is a top sectional view of Fig. 1 along lines 2—2;

Fig. 3 is a sectional view of another embodiment having an auxiliary coil for generating an impulse to open the primary circuit;

Fig. 4 is another embodiment with a slotted magnetic clutch member;

Fig. 5 is a diagram of the electrical circuit of the device of Fig. 1;

Figs. 6, 8 and 9 are other embodiments in which the device changes to the minimum torque transmitting condition on the occurrence of an excessive axial pressure;

Fig. 7 is a sectional view along lines 7—7 of Fig. 6 and shows the contact leaf spring;

Fig. 10 is a diagram of the electrical circuit of the embodiment shown in Fig. 8; and Fig. 11 is a diagram of the electrical circuit of the embodiment shown in Fig. 9.

The clutch members 20, 21 are in rigid contact and will not have any relative movement until the driven shaft has a resisting torque greater than the maximum torque that the clutch is able to transmit for the particular current throughout the coil. Then the two members slip. If the driven member slows up the switch 29 becomes disengaged and the current through the coil 24 drops to a minimum value and the minimum torque condition exists.

The driving member 21 comprises an outer casing 31 and an inner core 32. The outer casing 31 comprising a cylindrical portion 33 made of a magnetic material such as steel with end discs 34, 35 made of non-magnetic material such as brass. The end disc 34 is secured to the shaft 11 and fastened by bolts 36 to the cylindrical portion 33. The disc member 35 is fastened by bolts 37 to the other end of the cylindrical forming a chamber for the magnetic fluid. The inner core 32 comprises the coil 24 and a removable end 39 to permit the positioning of the coil 24. The inner core 32 is spaced from the outer cylindrical portion 33 forming an annular space therebetween. The driven member 20 is cup-shaped with a cylindrical portion 41 positioned in the annular space and an end disc 42 attached to the driven shaft 12.

The driven shaft 12 turns in bearings 44, 45 mounted in the end discs 34, 35 respectively, a third bearing 46 is provided in the inner core member 32 to transmit the axial thrust to the driving shaft. An extended portion 14 has a shoulder 15 engaging the inner ring 47 of the bearing 45. A snap ring 48 fits into a groove in the disc 35 and the outer ring 49 rests on it holding the shaft 12 in the clutch. An angular disposed shoulder 16 bears against the thrust bearing 46 to transmit axial pressure. Keys 17 are mounted in the portion 14 and the disc 42 of the clutch member 20 to transmit the torque to the shaft 12. A rubber seal 18 is positioned above the bearing 45 to hold the magnetic fluid in the clutch. When the fluid 19 is not solidified the driven shaft 12 and driven member 20 rotate freely and independently of the driving member when there is no energization of the coil.

The coil 24 is supplied with current from a direct current power source (not shown) through the slip rings 27, 28 mounted on the shaft 12 and the roller contacts 52, 53 attached to the casing 54. The casing 54 is mounted on the ball bearing 50 fitted on the shaft 12 so that the casing remains stationary on rotation of the shaft. The rheostat 25 is mounted on the casing 54 with the control knob 51 on the outside of the casing and the contact and resistor portions inside the casing. The rheostat 26 comprises a wire wound ring resistor 55 encircling the shaft 11 and spaced therefrom. The resistor 55 is held by mountings 59 in an outer metal collar 62 threaded onto the end disc 34. The resistor moves with the collar and the amount of resistance in the circuit is set by positioning the collar 62. A contact 69 is securely fastened around the surface of the shaft 11 and insulated therefrom and extends radially to engage the top of the resistor 55. A second contact 70 is secured to the inner side of the resistor and engages a slide ring 71 mounted on top of the disc 34 around the shaft 11. The resistor is adjusted by turning the collar 62 and spacing the two resistor contacts circumferentially. A switch 60 fastened in a recess 61 in the upper surface of the inner core 32 and has leaf springs 66, 68 mounted on opposite sides of the insulator block 72. The contacts 65, 67 are forced together by the pin 75 slidably mounted in a sleeve opening 76 in the partition between the recess 61 and recess 77. A leaf spring 80 is rigidly attached at one end to the inner core and at the other end to the pin 75 so that when the pin 75 is holding the contact 65, 67 together the spring is under tension. The pin 75 is actuated by the centrifugal members 30 mounted on the shaft 12 pressing outwardly when the shaft 12 rotates.

The centrifugal members comprise four arced pieces of metal mounted between the flanges 83, 84 of the mounting piece 85 and held together by the springs 86 fastened to the ends of the member by pins 87. The mounting piece fits on the end of the shaft 12 and rests against the shoulder 88 and held in place by the bolt 89 mounted on threads 90. The centrifugal members are positioned in the recess 77 and below the edge of the inner core. When the shaft 12 rotates the centrifugal members are thrown outwardly and press against seat 91 of the pin 75. The pin 75 has an insulated cap 98 engaging the electrical contact.

The current energizing the coil 24 is supplied by a cable 92 having wires 93, 94. Wire 93 is connected directly to the roller contact 52 and in turn is connected directly to one end of coil 24 by wire 95 in the shaft 11. Wire 94 is connected to the terminal 97 of the rheostat 25. The other terminal 99 is connected to the roller contact 51 by the wire 115 coupling the cable 92 across the slip rings 27, 28. The slip ring 27 is connected to the other end of the coil 24 by the wire 58. Slip ring 28 is connected to the contact 69 of the rheostat 26 and from the slide ring 71 to the coil 24 and contact 67 of the switch. The wire 58 is also connected to the terminal 63 of the contact 65, so that the switch 60 shunts the rheostats when contacts 65, 67 are closed. When the switch is open the current passes through wire 94 to the rheostat 25 and through wire 115 to the slip ring 28. From the slip ring 28 the current passes through the internal wire 58 to the rheostat 26 and from the rheostat to the coil 24. The current passes through the coil creating a magnetic field and then back to slip ring 28 through wire 95. Thus it is seen that the current must pass through rheostat 25, 26 in series and that the current determining the minimum torque is controlled by the position of the variable rheostats 25, 26. By controlling the current the flux density is controlled and the amount of torque transmitted by the solidified fluid is determined. By decreasing the resistance the current is increased and the torque transmitted increased. The rheostat 25 controls the maximum current permitted and therefore the maximum torque. The rheostat 26 along with rheostat 25 sets the minimum torque. By shunting rheostat 26 with a switch the resistance of the circuit is decreased and more current flows. Thus if the tool encounters an obstacle and stops, the switch is opened and the resistance increased and the current drops to its minimum value, removing the larger torque. This prevents the breakage of the tool.

The minimum torque is sufficient to start the tool before tapping so that the centrifugal members 30 will be thrown out to close the switch putting the clutch in condition to transmit the maximum torque.

By adjusting the knob 51 the maximum torque may be set depending on the type of tool used and the type of cutting. This renders the clutch universal for large variety of tools and uses requiring different maximum torques.

The centrifugal members present an almost continuous periphery to the pin. The pin is provided with a flat head 91 to distribute the pressure and bridge the gaps between the centrifugal members.

Another cicuit breaking arrangement is shown in Fig. 3 in which a coil 100 is positioned around the shaft 12 and a magnet 101 is mounted in a non-magnetic ring insert on the shaft 12 within the coil 100. The coil 100 is mounted on the casing 108 of the driving member and is energized by the magnet 101 mounted on the driven shaft 12. As long as there is no slippage the magnet 101 does not induce any current in the coil 100 but on the relative movement of the two parts impulses are created that acutate the relay 102 opening the contacts 103, 104 and breaking the circuit between the primary coils and the power source.

The coil 100 is held in position by the cap 107 that is bolted to the casing 108 of the driving member. The cap 107 is made of magnetic material and the coil 100 sets around the shaft 12. The wires 109 pass through the driving member and are connected to separate slip rings 105 shown schematically in Fig. 3 coupling the coil 100 with the coil 110 of the relay 102 magnetizing the core 106 drawing the armature 112 towards it thus disengaging the contacts 103, 104.

The armature 112 is held in the open position by the catch 113 thus returning the contacts 103, 104 apart until the catch 113 is released. The catch is released by the shaft 114 pulling against the spring 117 and turning the catch about the pivot 118. The armature is pulled upwardly by the spring 119 reengaging the contacts 103, 104 closing the primary circuit.

In operation the shaft 114 is pressed inward disengaging the catch 113 from the armature 112 permitting the spring 119 to pull the arm 120 up pressing the contacts 103, 104 together closing the circuit from the current source through the coil 24. The coil is energized and the magnetic fluid 19 is solidified transmitting the driving torque to the tap 13. The tap rotates until the bottom of the hole is reached. The shaft 12 then stops rotating or slows up and the maximum torque is applied to the tool. The driving member 20 turns and the driven member 21 slows up or stops causing a relative movement between the two members. The magnetic lines of force of the permanent magnet 101 cut the wires in the coil creating an impulse of electricity that energizes the relay 102 pulling the armature 112 toward the core 106 breaking the contact 103, 104. The contacts are held permanently open by the catch 113. The driving member 21 continues to rotate the driven member is stationary. To remove the tap 13 the shaft 11 is stopped, the relay 102 reset closing contacts 103, 104 and the coil 24 energized solidifying the fluid 19. The shaft 11 is reversed and turns the tap 13 removing it from the hole.

In another embodiment drawn in Fig. 4 the cylindrical magnetic member 41 has longitudinal slots 125 spaced around the sleeves forming air gaps and bars. On relative movement of the coil 24 and the sleeve 41 the magnetic lines of force will vary inducing variations in the direct current in the coil.

A relay and circuit breaker similar to the one shown in Fig. 3 may be connected in the primary circuit. The coil 110 of the relay 102 and the contacts 103, 104 will be connected in series so that the variations of current will energize the coil and open the contacts thereby deenergizing the coil 24. To energize the coil again the armature 112 will have to be released and the contacts 103, 104 held in engagement against the initial surge of current through the coil that would tend to disengage the contacts.

In Figs. 6 through 11 another embodiment of the invention is disclosed in which the shift from the maximum torque applying condition to the minimum torque applying condition occurs on the application of an excessive axial thrust. The driving member 21 and driven member 12 are axially movable in relation to each other when an excessive axial force is applied. The driven shaft 12 is mounted in the bearings 126, 127, 128. The bearings 126, 127 hold the driven member in axial alignment with the driving member. The bearing 126 holds the driven member in the driving member by the ledge 129 engaging the inner portion 133 of the bearing. The axial thrust is transmitted from the driving member 11 to the driven member 12 through the thrust bearing 128 and the rubber collar 133. The thrust bearing 128 sets on the upper shoulder 136 of the driven member 12. The rubber collar fits in the cylindrical recess 137 in the inner core 139 and engages the end surface or shoulder 144 at the upper end and the upper surface of the bearing 128 at the lower end. As the driven member pushes up the shoulder 129 it disengages from the inner portion 133 and the rubber is slightly compressed by the force applied by the two end surfaces. The amount of axial displacement depends on the relation of the force applied and the resiliency of the rubber. As axial thrust is applied the rubber collar 133 is compressed and the driven member telescopes into the driving member. The movement is slight but is sufficient to actuate the switch 147 and open its contacts 148, 149.

Grooves 150 are formed in the top of the rubber collar 135 into which keys 152 fit holding the rubber collar in place. The grooves 154 in the driving flange 156 are longer than the keys 157 so that the shaft 12 may move axially.

The switch 147 is fastened to the driving member. A recess portion 162 is provided in the upper end of the inner core 139. The core 139 is fastened to the end disc 34 as in the embodiment shown in Fig. 1. The recess 162 is open on the top surface of the inner core 163 and extends to the central bore of the driving member. The switch has two leaf springs 164, 165 with contacts 148, 149 and is mounted on an insulator 168. The insulator is bolted to the bottom of the recess. The upper spring 164 has a yoke 169 riding in an annular groove 171 on the driven shaft and moves up and down with the relative axial movement of the shafts disengaging and engaging the contacts 166, 167. The point of engagement is set by the adjusting bolt 172 threaded in the end disc 177 and passing through the hole 174 of the spring 164 and pressing against the lower spring 165. Under the pressure of the bolt the spring 165 is held under tension and the contact 149 moved to and from contact 166 by adjustment of the bolt 172. The bolt 172 can set the contact 149 so that the contacts 148, 149 will separate on the occurrence of a given axial thrust.

The circuit connections may be the same as for the embodiment shown in Fig. 1 or the switch may merely break the circuit to the coils and interrupt the current flow. When the drive shaft reverses and receives the excessive axial thrust the contacts will reengage and the clutch grip to remove the tool.

In Figs. 8 and 9 other embodiments of a thrust pressure control are shown in which a leaf spring is moved by the driven shaft to vary the pressure applied to a pressure variable resistor controlling the energization of the coil 24. In Figs. 8 and 10 the leaf spring 174 and the variable resistor 175 are positioned in a recess 176 in the inner core 177 of the driving member. The leaf spring engages at the free end a groove 178 in the driven shaft 179. The free end comprises a yoke 181 similar to the one in Fig. 6a. As the shaft 179 moves axially the leaf spring is flexed and the contact 183 presses against the top of the resistor 175 varying the resistance.

The resistor 175 is cylindrical in shape and comprises two thin flexible discs 184, 185 and cylindrical insulator 186 of slightly smaller diameter than the discs. The discs are secured to the insulator by bolts 187 threaded into the insulator 186. The resistor sets on the insulating disc 186 and is held in place by the bracket 188 secured to the wall of the insulator and fastened to the bottom of the recess.

When the axial thrust pressure becomes excessive and the rubber collar 135 becomes compressed the driven shaft 179 moves up into the driving member flexing the leaf spring 174 away from the resistor 175. The pressure on the resistor will be decreased and the current flow will decrease also. The wires are connected to the discs through the bolts 187 and in series with the rheostat 25. The lowest resistance of the resistor 175 and the rheostat 25 determines the maximum transmitting torque. The highest resistance of resistor 175 and the rheostat 25 determines the minimum torque transmitted. In Fig. 8 the wire 58 is connected to the disc 184 and the disc 185 is connected by the wire 189 to the coil 24.

Instead of relieving compression on the pressure variable resistor on an increase of axial pressure it may be increased. In Figs. 9 and 11 the variable resistor 190 is compressed by the contact 191 on the leaf spring 192 mounted on the bottom of the recess 194. The resistor 190 is mounted on the removable top 196 by the bracket 197. The leaf spring has a yoke shaped free end that has rollers running in the groove 198. The resistor 190 and rheostat 25 are connected in series and in parallel with the coil 24. The resistors 190 and 25 shunt the coil and as their combined resistance is increased the maximum torque that may be transmitted increases and as the resistance is lowered the minimum torque is decreased. In the circuit arrangement shown in Fig. 11 three slip rings are shown. The coil 24 is connected by wires across slip rings 198, 199 and the current supplied directly to the coil. The resistor 190 and rheostat 25 are connected in series. Rheostat 25 is connected between the terminal 200 and slip ring 201. The resistor 190 is connected to slip ring 201 at one end and at the other end 203 to slip ring 199. Thus the resistor 190 and rheostat 25 by-pass the coil 24. The amount of current shunted depends on the combined resistance.

I claim:

1. In a torque transmitting device having a magnetic driven member and a magnetic driving member, a flux producing coil on said driving member, a magnetic fluid energized by a current through said coil coupling said members, a switch in series with said coil, a permanent magnet on one of said members, an impulse coil magnetically coupled with said magnet on the other of said members and having impulses of electricity created therein on the relative movement of said members, a relay having a coil connected to said impulse coil and having an armature actuating said switch in response to said impulses to open said switch on energization of said relay coil by the impulses from said impulse coil.

2. In a torque transmitting device having driven and driving members with a coil on one of said members, a magnetic fluid between said members, said coil creating a magnetic fluid coupling between said members on passage of current therethrough, a switch in series with said coil, a flux means on one member and a current creating means on the other member coupled with the flux of said flux means for producing a current on relative movement between said driven member and said driving member and means actuating said switch coupled to said current creating means to receive the current therefrom to energize said actuating means to open said switch.

3. In a torque transmitting device as claimed in claim 2, said flux means comprises a permanent magnet on said driven member and said current creating means comprises an inductive coil on said driving member coupled with the field of said permanent magnet, said permanent magnet inducing currents in said inductive coil on relative movement between said driven member and said driving member.

References Cited in the file of this patent

UNITED STATES PATENTS

| 1,491,426 | Schunemann | Apr. 22, 1924 |
| 1,701,423 | Sauveur | Feb. 5, 1929 |
| 1,988,413 | Bing | Jan. 15, 1935 |
| 2,097,483 | Weydell | Nov. 2, 1937 |
| 2,153,195 | Lilja | Apr. 4, 1939 |
| 2,214,901 | Griffin | Sept. 17, 1940 |

FOREIGN PATENTS

| 485,591 | Belgium | Nov. 13, 1948 |

OTHER REFERENCES

Raymond Engineering Laboratory Report, Middletown, Connecticut, September 17, 1948. Copy received in Div. 68, March 23, 1949.

National Bureau of Standards Technical News Bulletin No. 12, volume 34, December 1950.

Technical Report 1213, National Bureau of Standards, Washington, D. C. Copy received in Div. 68 on March 30, 1948.